United States Patent
Kim et al.

(10) Patent No.: US 8,356,032 B2
(45) Date of Patent: Jan. 15, 2013

(54) METHOD, MEDIUM, AND SYSTEM RETRIEVING A MEDIA FILE BASED ON EXTRACTED PARTIAL KEYWORD

(75) Inventors: Jung Eun Kim, Suwon-si (KR); In Jeong Choi, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 569 days.

(21) Appl. No.: 11/651,042

(22) Filed: Jan. 9, 2007

(65) Prior Publication Data

US 2007/0198511 A1    Aug. 23, 2007

(30) Foreign Application Priority Data

Feb. 23, 2006  (KR) ................ 10-2006-0017769

(51) Int. Cl.
G06F 7/00  (2006.01)
G06F 17/30  (2006.01)

(52) U.S. Cl. .......................................... 707/736

(58) Field of Classification Search .............. 707/736
See application file for complete search history.

(56) References Cited

U.S. PATENT DOCUMENTS

| | | | | |
|---|---|---|---|---|
| 5,619,718 | A * | 4/1997 | Correa | 704/9 |
| 6,334,102 | B1 * | 12/2001 | Lewis et al. | 704/255 |
| 6,646,572 | B1 * | 11/2003 | Brand | 341/22 |
| 6,907,397 | B2 * | 6/2005 | Kryze et al. | 704/251 |
| 7,076,731 | B2 * | 7/2006 | Brill et al. | 715/257 |
| 7,496,515 | B2 * | 2/2009 | Glinski et al. | 704/270.1 |
| 2001/0056347 | A1 * | 12/2001 | Chazan et al. | 704/258 |
| 2003/0204399 | A1 * | 10/2003 | Wolf et al. | 704/251 |
| 2004/0054541 | A1 * | 3/2004 | Kryze et al. | 704/275 |
| 2004/0064306 | A1 | 4/2004 | Wolf et al. | |
| 2005/0004799 | A1 * | 1/2005 | Lyudovyk | 704/254 |
| 2006/0015484 | A1 * | 1/2006 | Weng et al. | 707/3 |
| 2006/0074670 | A1 * | 4/2006 | Weng et al. | 704/257 |
| 2006/0111904 | A1 * | 5/2006 | Wasserblat et al. | 704/246 |
| 2007/0276651 | A1 * | 11/2007 | Bliss et al. | 704/9 |

FOREIGN PATENT DOCUMENTS

| | | |
|---|---|---|
| JP | 2003-131674 | 5/2003 |
| JP | 2005-084422 | 3/2005 |
| KR | 2000-0026814 | 5/2000 |
| KR | 10-2001-0037652 | 5/2001 |
| KR | 2001-0044675 | 6/2001 |
| KR | 2001-0076508 | 8/2001 |
| KR | 2001-0091566 | 10/2001 |
| KR | 2001-0112971 | 12/2001 |
| KR | 10-2004-0089774 | 10/2004 |
| KR | 10-2005-0071237 | 7/2005 |
| KR | 10-2005-0101694 | 10/2005 |
| KR | 10-2006-0006282 | 1/2006 |

* cited by examiner

Primary Examiner — Robert Beausoliel, Jr.
Assistant Examiner — Michael Pham
(74) Attorney, Agent, or Firm — Staas & Halsey LLP (57) ABSTRACT

A method, medium, and system retrieving a media file associated with a partial keyword which is generated by using a named entity extracted from the media file, when a query is received from a user, with the media file being associated with the partial keyword being retrieved by identifying the partial keyword associated with the query through speech recognition. That is, a media file may be retrieved by extracting the named entity from the media file, performing a word segmentation for the extracted named entity, generating the partial keyword from the word-segmented named entity, and retrieving the corresponding media file by using the partial keyword.

32 Claims, 4 Drawing Sheets

METHOD, MEDIUM, AND SYSTEM RETRIEVING A MEDIA FILE BASED ON EXTRACTED PARTIAL KEYWORD

CROSS-REFERENCE TO RELATED APPLICATIONS

This application claims the priority benefit of Korean Patent Application No. 10-2006-0017769, filed on Feb. 23, 2006, in the Korean Intellectual Property Office, the disclosure of which is incorporated herein by reference.

BACKGROUND OF THE INVENTION

1. Field of the Invention

Embodiments of the present invention at least relate to a method, medium, and system retrieving a media file associated with a partial keyword, and more particularly, to a method, medium, and system retrieving a media file based on an extracted partial keyword when a query is received from a user, the media file may be retrieved by identifying the partial keyword associated with the query, e.g., through speech recognition.

2. Description of the Related Art

Currently, a huge number of music files can be stored on media devices as the capacities of such media devices have similarly greatly increased. On the other hand, with so many files, many users have difficulty in retrieving a particular saved music file since they are not able to remember the exact name of the saved music files.

Further, as more and more service companies have become involved in providing music content, a corresponding multimedia industry has developed. Users are also able to generate their own media files, such as through music files and the like. Accordingly, there are various types of methods, standards, and programs for embodying, titling, and storing such music information, and therefore a method capable of processing the various types of music files is required. Also, since the input/user interface of conventional media devices are so limited that a user has difficulty with inputting and maintaining the content of the media devices.

As an example, in a conventional media device, using a conventional technique, when a user vocalizes the query, "Hi, Girl," in an attempt to retrieve a saved music file "Hey, Girl", the user is not able to retrieve the saved music file "Hey Girl" since the term "Hi" is not matched with the "Hey Girl" saved music file name. Similarly, when the user vocalizes the query "Essay Love" to retrieve a saved music file "Essay of Love", the saved music file can not be retrieved since the term "of" is not included in the user's vocalization, which does not exactly match the saved music file name.

In one attempt to help, as discussed in U.S. Patent Publication No. 2004-0064306, when a user vocalizes a query, the query is transformed to a text query, and there is an attempt to match the transformed text query with a property of the available music files. However, this technique does not solve the aforementioned problems. Additionally, there may also be a problem with the efficiency of a module which performs the speech recognition, e.g., by attempting to recognize a phoneme of the speech and transforming the decoded speech into a text query. Also, with respect to a partial keyword, vocabularies that a user may use are so limited that the user would have to use only semantic queries, and consequently, a lexical restriction is required.

SUMMARY OF THE INVENTION

An aspect of the present invention is to provide a method, medium, and system retrieving a media file in which a named entity is extracted from a media file, a partial keyword capable of retrieving the media file is generated by performing a word segmentation of the named entity and the media file is retrieved by using the partial keyword, so that the media file may be easily retrieved without having to input exact information of the media file to be retrieved, even with incomplete pieces of information.

An aspect of the present invention also provides a method, medium, and system retrieving a media file in which a named entity for the media file is extracted by collecting at least any one of a file name, a folder name, a playlist, and an ID3 tag for media files, a word segmentation of the named entity is performed by a dynamic training from a hidden Markov model (HMM)-based probability model so that music information for the media file is filtered.

An aspect of the present invention also provides a method, medium, and system retrieving a media file in which a partial keyword is generated by predicting a user's vocalized query from a word-segmented named entity and the media file may be easily retrieved without having to input exact information of the media file to be retrieved by creating partial keyword lexicons including a plurality of partial keywords.

To achieve the above and/or other aspects and advantages, embodiments of the present invention include a method of retrieving a desired media file, including extracting at least one named entity from at least one media file, performing word segmentation on the at least one extracted named entity to generate at least one word-segmented named entity, generating at least one partial keyword from at least one word-segmented named entity, and retrieving a media file, as the desired media file, by comparing the at least one partial keyword and a request for the desired media.

The extracting of the at least one named entity from the at least one media file may include maintaining a media file in a media file database, collecting information associated with the media file from the media file database, and extracting the at least one named entity based on the collected information.

Further, the collecting of information may include collecting at least one of a file name, a folder name, a playlist, and an ID3 tag of the media file.

The extracting of the at least one named entity may include creating a deletion rule by a category tagging, and extracting the at least one named entity based on the collected information according to the deletion rule.

In addition, the performing of word segmentation may include computing a probability by a dynamic training from a hidden Markov model (HMM)-based probability model, and performing the word segmentation on the at least one extracted named entity based on the computed probability.

Here, the computing of the probability may further include building a static training database by detecting a word segmentation tag string for a given syllable string within a named entity of a media file collected from separate training data, building a dynamic training database from the at least one extracted named entity, and computing the probability of the word segmentation based on both the static training database and the dynamic training database.

The building of the dynamic training database may also include collecting an n-gram of a word segmentation from the at least one named entity, and building a dynamic training database based on the n-gram and a number of n-grams.

Further, the generating of the at least one partial keyword may include analyzing a corresponding morpheme of the at least one named entity, extracting a corresponding continuous partial vocabulary from the at least one named entity, extracting a corresponding discontinuous partial vocabulary from the at least one named entity, and generating the one partial keyword based on the corresponding continuous partial vocabulary and the corresponding discontinuous partial vocabulary.

The extracting of the corresponding continuous partial vocabulary and the corresponding discontinuous partial vocabulary may each include creating a tag connection rule by calculating an n-gram frequency of a part of a speech tag from a general corpus.

Here, the tag connection rule may define that a connection is possible when a connection frequency of a part of the speech tag is greater than a predetermined minimum value.

Further, the retrieving of the media file as the desired media file may also include generating partial keyword lexicons including the at least one partial keyword, receiving a query from a user, identifying a partial keyword associated with the query, and retrieving the media file, as the desired media file, associated with the identified partial keyword by referring to corresponding generated partial keyword lexicons.

The identifying of the partial keyword associated with the query may be performed with speech recognition to recognize the query, with the query being an audible query by the user.

To achieve the above and/or other aspects and advantages, embodiments of the present invention include a medium including computer readable code to implement a method of retrieving a desired media file, the method may include extracting at least one named entity from at least one media file, performing word segmentation on the extracted at least one named entity to generate at least one word-segmented named entity, generating at least one partial keyword from the at least one word-segmented named entity, and retrieving a media file, as the desired media file, by comparing the at least one partial keyword and a request for the desired media.

To achieve the above and/or other aspects and advantages, embodiments of the present invention include a system of retrieving a desired media file, the apparatus may include a named entity extraction module to extract at least one named entity from at least one media file, a word segmentation recovery module to perform word segmentation for the extracted at least one named entity to generate at least one word-segmented named entity, a partial keyword generation module to generate at least one partial keyword from the at least on word-segmented named entity, and a media file retrieve module to retrieve a media file, as the desired media file, by comparing the at least one partial keyword and a request for the desired media.

The system may further include a media file database to maintain the at least one media file, and a word information collection module to collect information associated with the at least one media file, from at least the media file database, wherein the named entity extraction module extracts the at least one named entity based on the collected information.

Here, the word information collection module may collect at least one of a file name, a folder name, a playlist, and an ID3 tag of the at least one media file.

The named entity extraction module may still further create a deletion rule by a category tagging and extracts the at least one named entity from the collected information.

The system my further include a probability calculation module to compute probability by a dynamic training from an HMM-based probability model, wherein the word segmentation recovery module performs the word segmentation for the extracted at least one named entity based on the computed probability.

Here, the probability calculation may build a static training database by detecting a word segmentation tag string for a given syllable string within a named entity of a media file collected from separate training data, builds a dynamic training database from the extracted at least one named entity, and computes the probability of the word segmentation based on both the static training database and the dynamic training database.

In addition, the dynamic training database may collect an n-gram of the word segmentation from the at least one named entity and builds the dynamic training database based on the n-gram and a number of n-grams.

Still further, the system may include a morpheme analysis module to analyze a corresponding morpheme of the at least one named entity, and a word extraction module to extract a corresponding continuous partial vocabulary and a corresponding discontinuous partial vocabulary of the at least one named entity, wherein the partial keyword generation module generates the one partial keyword based on the corresponding continuous partial vocabulary and the corresponding discontinuous partial vocabulary.

Further, the system may include a lexicons generation module to generate partial keyword lexicons including the at least one partial keyword, and an input module to input a query from a user, a recognition module to identify the partial keyword associated with the query, wherein the media file search module retrieves the media file, as the desired media file, associated with the identified partial keyword by referring to corresponding generated partial keyword lexicons.

Here, the recognition module may be a speech recognition module and the query may be an audible query by the user.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below in order to explain the present invention by referring to the figures.

Figure 1:
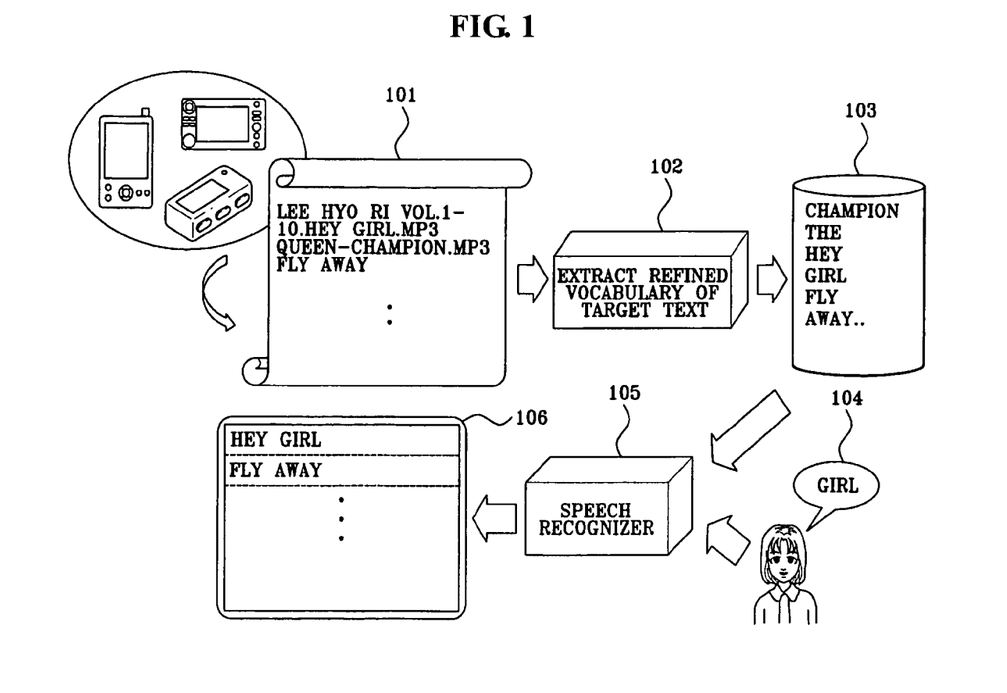
FIG. 1 schematically illustrates a method for retrieving a media file by using a partial keyword, according to an embodiment of the present invention.

FIG. 1 schematically illustrates a method for retrieving a media file by using a partial keyword, according to an embodiment of the present invention.

As illustrated in FIG. 1, in operation 101, a media file may be stored in a media file database, with the media file potentially have any of various types of document extensions, such as an mp3, a wma, an asf, an ogg and the like, for example. Alternate media file types are equally available.

In operation 102, refined vocabularies of a target text may be extracted for a media file. In this illustrated embodiment, a named entity, i.e. the target text, of the media file is extracted in order to enable a user to easily search for the media file from among a number of media files. The named entity may be extracted from a file name, a singer, a folder name, and an ID3 tag and the like, for example, of the media file. After extracting the named entity from the media file and refining the extracted named entity, a partial keyword, i.e. a vocabulary, may be generated. A more detailed description of the refining of the named entity and generating of the partial keyword will be described in greater detail in FIG. 2.

In operation 103, the generated partial keyword may be stored and managed by adding the generated partial keyword to a collection of partial keywords. The collection of the partial keywords may include all generated partial keywords associated with media files stored in the media file database, for example.

In operation 104, a user may vocalize a query, e.g., "GIRL", associated with a media file desired to be retrieved.

In operation 105, the partial keyword associated with the query may then be identified, e.g., by speech recognition of the vocalized query. As an example, the recognized "GIRL" query may be identified as corresponding to the partial keyword "GIRL", as illustrated in FIG. 1.

In operation 106, keyword lexicons of the stored media files may be provided by retrieving media file associated with the identified partial keyword.

As an example, a keyword lexicon of one media file may be a keyword lexicon including the word "GIRL". Accordingly, the user may be able to selectively play the media file associated with the keyword lexicons of the media file According to an embodiment of the present invention, the media file may be retrieved by the predefined partial keywords, unlike in conventional systems, so that media files may be easily retrieved without having to input the exact information for a desired media file, even with incomplete pieces of information.

Figure 2:
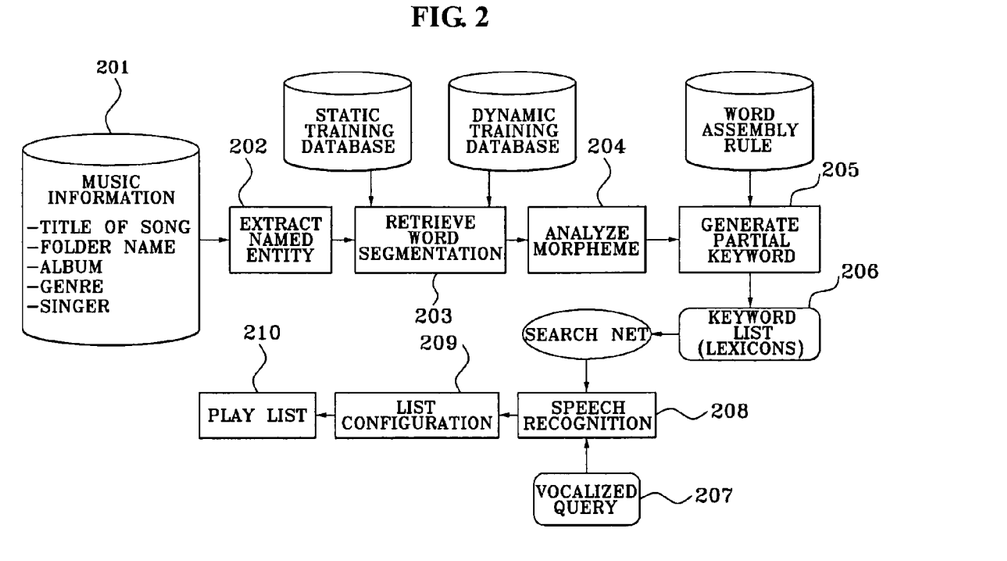
FIG. 2 illustrates a method for retrieving a media file, according to an embodiment of the present invention.

FIG. 2 illustrates a method retrieving a media file, according to an embodiment of the present invention.

In operation 201, a media file may be retrieved from a media file database, for example. Here, music information regarding the media file, such as a song title, a folder name, an album, a genre, a singer and the like, may be maintained in the media file database.

In operation 202, a named entity from the media file may then be extracted. Namely, the named entity may be extracted by using the music information such that the extracted named entity is used to generate at least one partial keyword. As an example, the named entity may be extracted by using information collected from the media file, e.g., a file name under which the media file is saved, a folder name of where the media file is saved in the media file database, an album name corresponding to the media file, a genre the media file belongs to, a playlist, an ID3 tag, and so forth, noting that alternative examples are equally available.

According to an embodiment, a deletion rule may be created by a category tagging to extract the named entity from the collected information according to the deletion rule, for example. After the at least one partial keyword is generated, or coincident therewith, additional partial keywords may be generated from alternate named entities, e.g., for the same media files or other media files.

Figure 3:
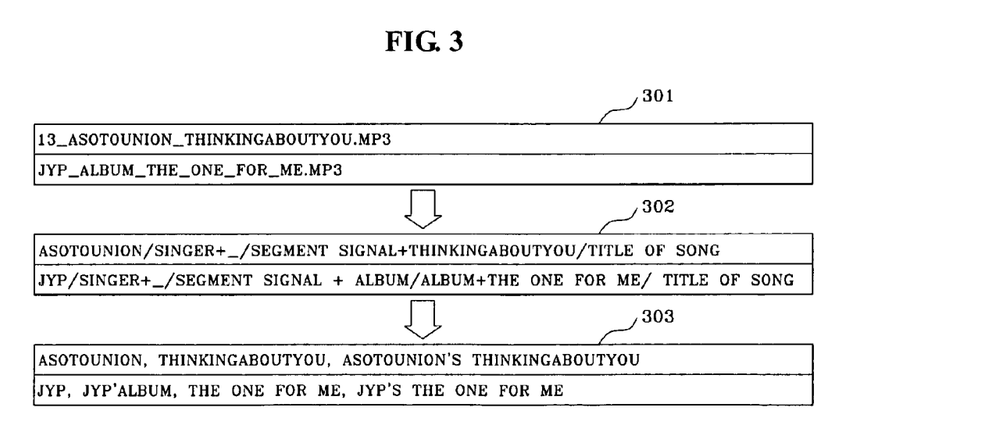
FIG. 3 illustrates a process for extracting a named entity for media files, according to an embodiment of the present invention.

FIG. 3 illustrates a process of extracting a named entity from a media file according to an embodiment of the present invention.

As shown in reference number 301 in FIG. 3, media files having a file name such as, 13_AsotoUnion_ThinkingaboutYou.MP3 and JYP_Album_The_One_for_Me.MP3 may be retrieved. In the file name, the numeral '13', the special symbol '_', the song title 'ThinkingaboutYou', in which word segmentation is deleted, and the song title, in which word segmentation is replaced with a special symbol '_', are saved as they originally are. The numeral and the special symbol can be exchanged since they are unnecessary when retrieving the media file. Accordingly, a deletion rule may be generated to delete unnecessary information by a category tagging, and the numeral and the special symbol may then be deleted according to the deletion rule.

As shown reference number 302 in FIG. 3, the file name can be refined by deleting the numeral and the special symbol according to the deletion rule. For example, "AsotoUnion" may be determined to correspond to a singer, "ThinkingaboutYou" may be determined to correspond to a song title, "JYP" may be determined to correspond to a singer, "album" may be determined to correspond to an album, "The One for Me" may be determined to correspond to a title of a song. Therefore, information on each media file is able to be collected in order to extract at least one partial keyword.

As shown in reference number 303 in FIG. 3, a named entity may be extracted with the collected information. Here, a plurality of named entities can be extracted from the collected information, e.g., the singer is matched to "JYP", the singer+the album is matched to "JYP_Album", the song title to "The_One_for_Me", the singer+the title of the song may be matched to "JYP's The_One_for_Me", and the like.

Again referring to FIG. 2, in operation 203, a word segmentation may be performed for the extracted named entity. Since both an extracted named entity having an appropriate word segmentation and also an extracted named entity having an inappropriate word segmentation are possible, the word segmentation may be performed for the extracted named entity through operation 203; described in greater detail below.

According to an embodiment of the present invention, the word segmentation may be performed by using both an algorithm of a dynamic word segmentation and a static word segmentation model.

As an example, data may be stored within an apparatus or system retrieving the media file(s) in a user device, with the data continuously changing. Accordingly, a dynamic algorithm may be used, with the dynamic word segmentation indicating gaining using as much information as possible from such a user device for the word segmentation. In this case, the probability of the word segmentation may be computed by a dynamic training from an HMM-based probability model.

Computing the probability of the dynamic word segmentation may also include computing the probability of the word segmentation based on the HMM by building a static training database, such that the computing of the probability of the word segmentation is able to be controlled and accomplished by the building the dynamic training database.

The static training database for a probability study based on the HMM is able to be built by detecting a word segmentation tag string for a given syllable within the named entity.

As an example, syllable strings of "The_One_for_Me" can be detected as "The/1+One/1+for/1+Me/0" and syllable strings of "ThinkingaboutYou" may be detected as "Thinking/0+about/0+You/0".

Namely, when the tag string for the syllable string is a zero, a word segmentation after the syllable string may be excluded, and when the tag string for a syllable string is a one, a word segmentation after the syllable string may be included.

The dynamic training database may be built by collecting an n-gram of the word segmentation from the named entity, e.g., the song title, the file name, and the like, and by building the dynamic training database of both the n-gram and a number of the n-grams. The n-gram is a process of extracting adjacent n syllables for the named entity. As an example, with respect to "The_One_for_Me", with an n-gram being 2-grams, two adjacent syllables are extracted, such as "The One", "for Me", "One for" and the like, and with an n-gram being 3-grams, three adjacent syllables are extracted, such as "The One for", "One for Me" and the like.

The static training database and the dynamic training database may be built as described above. The probability of the word segmentation may be computed by controlling the probability of the word segmentation based on the HMM gained from the static training database and the dynamic training database.

The probability of the word segmentation may be provided by the following Equation 1, for example.

Equation 1:

$$P(T, S) \approx \prod_{i=1}^{n} P(s_i | s_{i-a,i-1}, t_{i-b,i-1}) P(t_i | s_{i-c,i}, t_{i-d,i-1})$$

Here, S indicates a syllable string and T indicates a tag string.

Equation 2:

$$P(t_i | s_{i-c,i}, t_{i-d,i-1}) = \alpha P_s(t_i | s_{i-c,i}, t_{i-d,i-1}) + (1 - \alpha) x * \log y$$

$$P(t_i | S_{i-c,i}, t_{i-d,i-1}) = P(t_i | S_{i-c,i}, t_{i-d,i-1}) \quad \text{Equation 3}$$

Above, Equation 2 may be applicable to the case where the n-gram occurs in the dynamic training database and Equation 3 may be applicable to the case where the n-gram does not occur in the dynamic training database. In Equation 2, x is an average probability value of $P(t_i | S_{i-c,i}, t_{i-d,i-1})$ and the y is a number of dynamic training databases.

In operations 204 and 205 of FIG. 2, a partial keyword may be generated by analyzing a morpheme of the word-segmented named entity.

Figure 4:
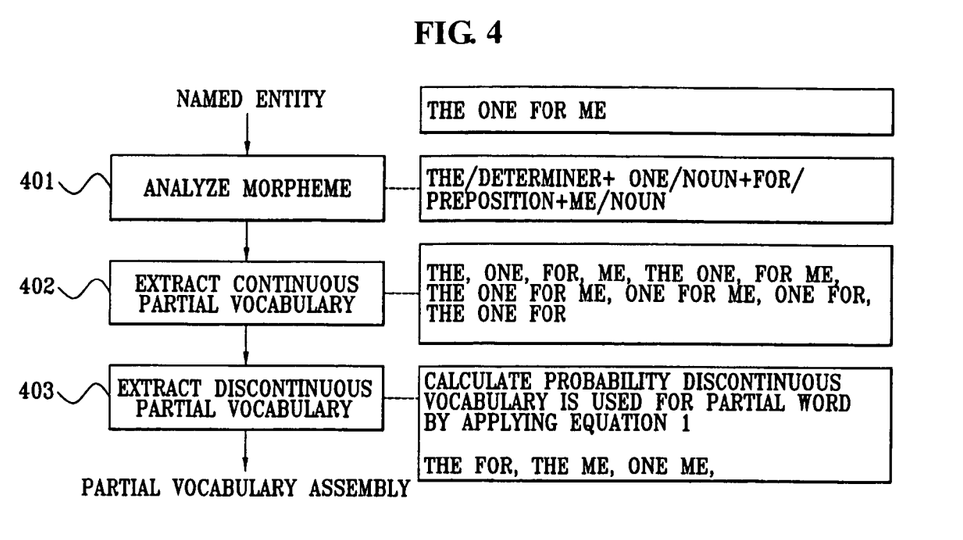
FIG. 4 illustrates a process for generating a partial keyword, according to an embodiment of the present invention.

Below, a process shown in FIG. 4 will now be described. FIG. 4 illustrates a process of generating a partial keyword according to an embodiment of the present invention.

In operation 401, a morpheme of the word-segmented named entity "The one for me" may be analyzed. Namely, the morpheme for "The one for me" may be divided into "The/determiner+one/noun+for/preposition+me/noun".

In operation 402, a continuous partial vocabulary may be extracted from the named entity. According to an embodiment of the present invention, a tag connection rule may be created by computing an n-gram frequency of a part of a speech tag from a general corpus, and the connection may be possible when a n-gram frequency of the part of the speech tag is over a predetermined minimum value. The continuous partial vocabulary may be one minimal meaningful vocabulary, two continuous vocabularies, three continuous vocabularies, or the like, which are extracted from the named entity.

In operation 403, a discontinuous partial vocabulary may be extracted from the morpheme-analyzed named entity. This operation of the extracting discontinuous partial vocabulary is similar to the operation of the extracting continuous partial vocabulary. Namely, as described before, a tag connection rule may be created by computing an n-gram frequency of a part of speech tag from a general corpus, and the connection may be possible when a connection frequency of a part of speech tag is greater than a predetermined minimum value. The partial keyword may be generated with the continuous partial vocabulary and the discontinuous partial vocabulary.

Again referring to FIG. 2, partial keyword lexicons including the partial keyword may be generated. Each of the partial keyword lexicons may include a plurality of partial keywords which are generated from a media file stored in the media file database.

In operations 207 and 208, a partial keyword associated with a vocalized query may be identified by speech recognition. As an example, when a user vocalizes "you", "me" and the like for the query, the partial keyword associated with the query may be identified by speech recognizing the spoken query.

In operations 209 and 210, a media file associated with the partial keyword may be retrieved by referring to the partial keyword lexicon and a playlist may be provided by creating the list including the retrieved media file(s). The playlist may include a plurality of media file(s) lists including the partial keyword. As an example, when a user vocalizes "you" of the query, the list may be created to include a plurality of media files, such as "I love you, thank you", "I owe you", "You raise me high" and the like, so that the user may retrieve and play a selected music from the list.

According to an embodiment of the present invention, the desired media file may be retrieved since the vocalized query is morphologically recognized. Also, the desired media file may be retrieved since the query is phonemically recognized and symbolically matched to the partial keyword lexicons. Also, the query is phonemically recognized and the partial keyword lexicons can be used for a result selection and result verification, so that the media file may be appropriately retrieved.

According to an embodiment of the present invention, a partial keyword may be generated by predicting the user's vocalized query from the named entity in which the word segmentation is performed and a desired media file may be easily retrieved without having to input the exact information of the desired media file by creating partial keyword lexicons including a plurality of partial keywords.

Figure 5:
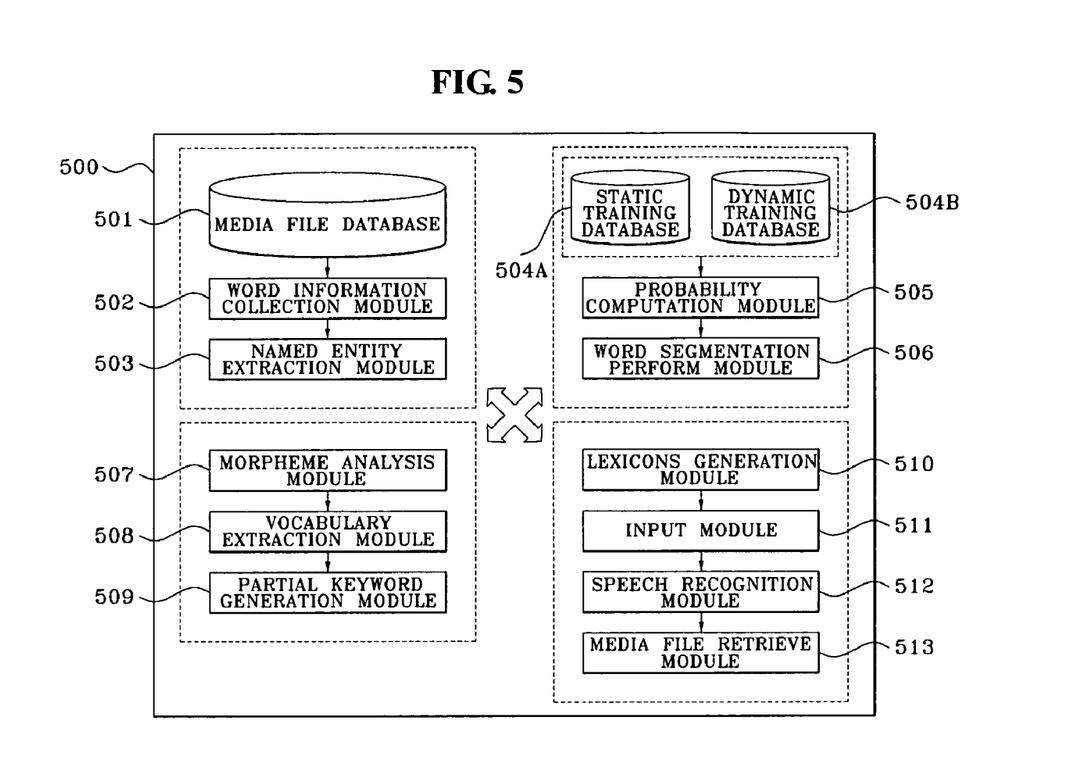
FIG. 5 illustrates a system to retrieve a media file, according to an embodiment of the present invention.

FIG. 5 illustrates a system/apparatus retrieving a media file, according to an embodiment of the present invention, by implementing embodiments of the present invention.

A system retrieving a media file 500 may include a media file database 501, or have access to the same, a word information collection module 502, a named entity extraction module 503, a static training database 504a, a dynamic training database 504b, a probability computation module 505, a word segmentation perform module 506, a morpheme analysis module 507, a vocabulary extraction module 508, a partial keyword generation module 509, a lexicons generation module 510, an input module 511, a speech recognition module 512, and a media file retrieve module 513, for example.

The media file database 501 may store the media file, along with other media files, and may include information associated with the media file. The music information may be at least one of a file name, a folder name, a playlist, and/or an ID3 tag of the media file, for example.

The word information collection module 502 may collect information associated with the media file from the file database 501, and the word information collection module 502 may collect any of the music information such as a file name, a folder name, a playlist, and an ID3 tag from the media file.

The named entity extraction module 503 may extract a named entity by using the collected information. Similar to that described above, with reference to FIG. 3, the named entity extraction module 503 may create a deletion rule by a category tagging and extract the named entity from the collected information.

The probability computation module 505 may build a static training database 504a by detecting a word segmentation tag string for a given syllable string within the named entity of the media file, as collected from separate training data, and may further build a dynamic training database 504b from the extracted named entity. The word segmentation perform module 506 may perform a word segmentation for the extracted named entity by using the computed probability.

The word segmentation perform module 506 may, thus, perform a word segmentation for the extracted named entity by using the computed probability.

Similar to that described above with reference to FIG. 4, the morpheme analysis module 507 may analyze a morpheme of the word-segmented named entity.

Referring to FIG. 4, the morpheme analysis module 507 may analyze a morpheme of the word-segmented named entity.

The vocabulary extraction module 508 may extract a continuous partial vocabulary from the named entity and a discontinuous partial vocabulary from the named entity.

The partial keyword generation module 509 may further generate the partial keyword with a continuous partial vocabulary and a discontinuous partial vocabulary.

The lexicons generation module 510 may still further generate partial keyword lexicons including the partial keyword. The partial keyword lexicons may include all the partial keywords that can be used to retrieve a corresponding media file stored in the media file database 501.

The input module 511 may receive a query from a user, such as through a vocalized input of the query.

The speech recognition module 512 may identify a partial keyword associated with the query through speech recognition, for example.

According to an embodiment of the present invention, a named entity may be extracted from a media file(s), a word segmentation may be performed for the extracted named entity, a partial keyword may be generated from the word-segmented named entity, and the desired media file may be retrieved by using the partial keyword and comparing an input query to a collection of the same.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission systems, for example. Here, the medium may further be a signal, such as a resultant signal or bitstream, according to embodiments of the present invention. The media may also be a distributed network, so that the computer readable code is stored/transferred and executed in a distributed fashion.

Examples of such instructions include both machine code, such as produced by a compiler, and files containing higher level code that may be executed by a computer using an interpreter, for example.

According to an embodiment of the present invention, a named entity may be extracted from/for a media file, a partial keyword capable of retrieving a media file may be generated by retrieving a word segmentation of the named entity and the desired media file may be retrieved by using the partial keyword, so that the desired media file may be easily retrieved without having to input exact information of the desired media file, even with incomplete information.

Further, according to an embodiment of the present invention, the named entity for the media file may be extracted by collecting at least any one of a file name, a folder name, a playlist, and an ID3 tag, and the word segmentation of the named entity may be performed by a dynamic training from an HMM, so that music information for the media file is refined.

Still further, according to an embodiment of the present invention, a partial keyword may be generated by predicting the user's vocalized query from the word-segmented named entity and the desired media file may be easily retrieved without having to input exact information of the desired media file to be searched by creating partial keyword lexicons including a plurality of partial keywords.

Although a few embodiments of the present invention have been shown and described, the present invention is not limited to the above described embodiments. Instead, it should be appreciated by those skilled in the art that changes may be made to these embodiments without departing from the principles and spirit of the invention, the scope of which is defined at least by the claims and their equivalents.

What is claimed is:

1. A method of retrieving a desired media file, comprising:
   extracting at least one named entity from at least one media file;
   calculating a word spacing probability of the extracted at least one named entity and spacing the at least one extracted named entity to generate at least one word-spaced named entity based on the calculated word spacing probability, wherein the calculating of the word spacing probability comprises:
      building a static training database by detecting a word spacing tag string for a given syllable string within a named entity of a media file collected from separate training data, the word spacing tag string indicating whether or not to include word spacing after the syllable string;
      building a dynamic training database from the at least one extracted named entity; and
   calculating the word spacing probability based on both the static training database and the dynamic training database;
   using at least one processor device for generating at least one partial keyword that include all or a part of the at least one word-spaced named entity; and
   retrieving a media file, as the desired media file, by comparing the at least one partial keyword and a request for the desired media.

2. The method of claim 1, wherein the extracting of the at least one named entity from the at least one media file comprises:

maintaining a media file in a media file database;
collecting information associated with the media file from the media file database, with the information being associated with different types of information regarding the media file; and
extracting the at least one named entity based on the collected information.

3. The method of claim 2, wherein the collecting of information comprises collecting the information from at least one of an information type of a file name, a folder name, a playlist, and an ID3 tag of the media file.

4. The method of claim 2, wherein the extracting of the at least one named entity comprises:
creating a deletion rule by a category tagging; and
extracting the at least one named entity based on the collected information according to the deletion rule.

5. The method of claim 1, wherein the calculating of the word spacing probability comprises:
computing the word spacing probability by a dynamic training from a hidden Markov model (HMM)-based probability model.

6. The method of claim 1, wherein the building of the dynamic training database comprises:
collecting an n-gram of a word spacing from the at least one named entity; and
building a dynamic training database based on the n-gram and a number of n-grams.

7. A method of retrieving a desired media file, comprising:
extracting at least one named entity from at least one media file;
calculating a word spacing probability of the extracted at least one named entity, wherein the calculating of the word spacing probability comprises:
building a static training database by detecting a word spacing tag string for a given syllable string within a named entity of a media file collected from separate training data, the word spacing tag string indicating whether or not to include word spacing after the syllable string;
building a dynamic training database from the at least one extracted named entity; and
calculating the word spacing probability based on both the static training database and the dynamic training database;
performing word spacing on the at least one extracted named entity to generate at least one word-spaced named entity based on the calculated word spacing probability;
using at least one processor device for generating at least one partial keyword that include all or a part of the at least one word-spaced named entity; and
retrieving a media file, as the desired media file, by comparing the at least one partial keyword and a request for the desired media, wherein the generating of the at least one partial keyword comprises:
analyzing a corresponding morpheme of the at least one named entity;
extracting a corresponding continuous partial vocabulary from the at least one named entity;
extracting a corresponding discontinuous partial vocabulary from the at least one named entity; and
generating the one partial keyword based on the corresponding continuous partial vocabulary and the corresponding discontinuous partial vocabulary.

8. The method of claim 7, wherein the extracting of the corresponding continuous partial vocabulary and the corresponding discontinuous partial vocabulary each comprise creating a tag connection rule by calculating an n-gram frequency of a part of a speech tag from a general corpus.

9. The method of claim 8, wherein the tag connection rule defines that a connection is possible when a connection frequency of a part of the speech tag is greater than a predetermined minimum value.

10. The method of claim 1, wherein the retrieving of the media file as the desired media file comprises:
generating partial keyword lexicons including the at least one partial keyword;
receiving a query from a user;
identifying a partial keyword associated with the query; and
retrieving the media file, as the desired media file, associated with the identified partial keyword by referring to corresponding generated partial keyword lexicons.

11. The method of claim 10, wherein the identifying of the partial keyword associated with the query is performed with speech recognition to recognize the query, with the query being an audible query by the user.

12. A system including at least one processor device to retrieve a desired media file, the system comprising:
a named entity extraction unit to extract at least one named entity from at least one media file;
a word spacing recovery unit, using the at least one processor device, to calculate a word spacing probability of the extracted at least one named entity and to space the extracted at least one named entity to generate at least one word-spaced named entity based on the calculated word spacing probability, wherein the calculating of the word spacing probability includes building a static training database by detecting a word spacing tag string for a given syllable string within a named entity of a media file collected from separate training data, the word spacing tag string indicating whether or not to include word spacing after the syllable string, building a dynamic training database from the extracted at least one named entity, and computing the word spacing probability based on both the static training database and the dynamic training database;
a partial keyword generation unit to generate at least one partial keyword from the at least one word-spaced named entity; and
a media file retrieve unit to retrieve a media file, as the desired media file, by comparing the at least one partial keyword and a request for the desired media.

13. The system of claim 12, further comprising:
a media file database to maintain the at least one media file; and
a word information collection module to collect information associated with the at least one media file, from at least the media file database, with the information being associated with different types of information regarding the at least one media file,
wherein the named entity extraction unit extracts the at least one named entity based on the collected information.

14. The system of claim 13, wherein the word information collection module collects the information from at least an information type of one of a file name, a folder name, a playlist, and an ID3 tag of the at least one media file.

15. The system of claim 13, wherein the named entity extraction unit creates a deletion rule by a category tagging and extracts the at least one named entity from the collected information.

16. The system of claim 12, further comprising:
a probability calculation module to compute the word spacing probability by a dynamic training from an HMM-based probability model,
wherein the word spacing recovery unit word-spaces the extracted at least one named entity based on the computed word spacing probability.

17. The system of claim 12, wherein the dynamic training database collects an n-gram of the word spacing of the at least one named entity and builds the dynamic training database based on the n-gram and a number of n-grams.

18. A system, including at least one processor device, to retrieve a desired media file, the system comprising:
a named entity extraction module to extract at least one named entity from at least one media file;
a probability computation module, using the at least one processor device, to calculate a word spacing probability of the extracted at least one named entity, wherein the calculating of the word spacing probability includes building a static training database by detecting a word spacing tag string for a given syllable string within a named entity of a media file collected from separate training data, the word spacing tag string indicating whether or not to include word spacing after the syllable string, building a dynamic training database from the extracted at least one named entity, and computing the word spacing probability based on both the static training database and the dynamic training database;
a word spacing recovery module to perform word spacing on the extracted at least one named entity to generate at least one word-spaced named entity based on the word spacing probability calculated by the probability computation module;
a partial keyword generation module to generate at least one partial keyword that include all or a part of the at least one word-spaced named entity;
a media file retrieve module to retrieve a media file, as the desired media file, by comparing the at least one partial keyword and a request for the desired media;
a morpheme analysis module to analyze a corresponding morpheme of the at least one named entity; and
a word extraction module to extract a corresponding continuous partial vocabulary and a corresponding discontinuous partial vocabulary of the at least one named entity,
wherein the partial keyword generation module generates the one partial keyword, using the at least one processor device, based on the corresponding continuous partial vocabulary and the corresponding discontinuous partial vocabulary.

19. The system of claim 12, further comprising:
a lexicons generation module to generate partial keyword lexicons including the at least one partial keyword; and
an input module to input a query from a user,
a recognition module to identify the partial keyword associated with the query,
wherein the media file search module retrieves the media file, as the desired media file, associated with the identified partial keyword by referring to corresponding generated partial keyword lexicons.

20. The system of claim 19, wherein the recognition module is a speech recognition module and the query is an audible query by the user.

21. A method of retrieving a desired media file, comprising:
extracting at least one named entity from at least one media file;
spacing the at least one extracted named entity to generate at least one word-spaced named entity, the spacing being based on a building of a static training database by detecting a word spacing tag string for a given syllable string within a named entity of a media file collected from separate training data, the word spacing tag string indicating whether or not to include word spacing after the syllable string, a building of a dynamic training database from the at least one extracted named entity, and a computing of a word spacing probability based on both the static training database and the dynamic training database, and with the spacing being based on the computed word spaced probability;
using at least one processor device for generating at least one partial keyword from at least one word-spaced named entity; and
retrieving a media file, as the desired media file, by comparing the at least one partial keyword and a request for the desired media.

22. A system, including at least one processor device, to retrieve a desired media file, the system comprising:
a named entity extraction module to extract at least one named entity from at least one media file;
a word-spacing recovery module to space the extracted at least one named entity to generate at least one word-spaced named entity, the spacing being based on a building of a static training database by detecting a word spacing tag string for a given syllable string within a named entity of a media file collected from separate training data, the word spacing tag string indicating whether or not to include word spacing after the syllable string, a building of a dynamic training database from the at least one extracted named entity, and a computing of a word spacing probability based on both the static training database and the dynamic training database, and with the spacing being based on the computed word spacing probability;
a partial keyword generation module to generate at least one partial keyword from the at least one word-spaced named entity; and
a media file retrieve module to retrieve a media file, as the desired media file, by comparing the at least one partial keyword and a request for the desired media.

23. A method of retrieving a desired media file, comprising:
extracting at least one named entity from at least one media file;
calculating a word spacing probability of the extracted at least one named entity, wherein the calculating of the word spacing probability comprises:
building a static training database by detecting a word spacing tag string for a given syllable string within a named entity of a media file collected from separate training data, the word spacing tag string indicating whether or not to include word spacing after the syllable string;
building a dynamic training database from the at least one extracted named entity by collecting an n-gram of a word spacing from the at least one named entity, and with the n-gram being at least a 2-gram and representing a corresponding at least two extracted adjacent syllables; and
computing the word spacing probability based on both the static training database and the dynamic training database;
performing word spacing on the at least one extracted named entity from the at least one media file to generate at least one word-spaced named entity based on the calculated word spacing probability;

using at least one processor device for generating at least one partial keyword from at least one word-spaced named entity; and retrieving a media file, as the desired media file, by comparing the at least one partial keyword and a request for the desired media.

24. A system, including at least one processor device, to retrieve a desired media file, the system comprising:

a named entity extraction unit to extract at least one named entity from at least one media file;

a probability computation module, using the at least one processor device, to calculate a word spacing probability of the extracted at least one named entity, wherein the calculating of the word spacing probability comprises:

building a static training database by detecting a word spacing tag string for a given syllable string within a named entity of a media file collected from separate training data, the word spacing tag string indicating whether or not to include word spacing after the syllable string;

building a dynamic training database from the at least one extracted named entity by collecting an n-gram of a word spacing from the at least one named entity, and with the n-gram being at least a 2-gram and representing a corresponding at least two extracted adjacent syllables; and computing the word spacing probability based on both the static training database and the dynamic training database;

a word spacing recovery module to perform word spacing on the at least one named entity from the at least one media file to generate at least one word-spaced named entity based on the calculated word spacing probability;

a partial keyword generation module to generate at least one partial keyword from the at least one word-spaced named entity; and a media file retrieve module to retrieve a media file, as the desired media file, by comparing the at least one partial keyword and a request for the desired media.

25. The method of claim 1, wherein the extracting of the at least one named entity includes applying a deletion rule to information from the at least one media file, to delete determined unnecessary information or symbols, with the extracting of the at least one named entity including extracting the at least one named entity from the information without the unnecessary information or symbols.

26. The method of claim 7, wherein the extracting of the at least one named entity includes applying a deletion rule to information from the at least one media file, to delete determined unnecessary information or symbols, with the extracting of the at least one named entity including extracting the at least one named entity from the information without the unnecessary information or symbols.

27. The system of claim 12, wherein named entity extraction unit applies a deletion rule to information from the at least one media file, to delete determined unnecessary information or symbols, with the extracting of the at least one named entity including extracting the at least one named entity from the information without the unnecessary information or symbols.

28. The system of claim 18, wherein named entity extraction unit applies a deletion rule to information from the at least one media file, to delete determined unnecessary information or symbols, with the extracting of the at least one named entity including extracting the at least one named entity from the information without the unnecessary information or symbols.

29. The method of claim 21, wherein the extracting of the at least one named entity includes applying a deletion rule to information from the at least one media file, to delete determined unnecessary information or symbols, with the extracting of the at least one named entity including extracting the at least one named entity from the information without the unnecessary information or symbols.

30. The system of claim 22, wherein the named entity extraction unit applies a deletion rule to information from the at least one media file, to delete determined unnecessary information or symbols, with the extracting of the at least one named entity including extracting the at least one named entity from the information without the unnecessary information or symbols.

31. The method of claim 23, wherein the extracted at least one named entity does not include determined unnecessary information or symbols according to a deletion rule.

32. The system of claim 24, wherein the extracted at least one named entity does not include determined unnecessary information or symbols according to a deletion rule.

* * * * *